US012664301B2

(12) United States Patent (10) Patent No.: US 12,664,301 B2
Parkinson et al. (45) Date of Patent: Jun. 23, 2026

(54) UNSUBSCRIBE AND DELETE AUTOMATION

(71) Applicant: ALLSTATE INSURANCE COMPANY, Northbrook, IL (US)

(72) Inventors: John S. Parkinson, Northbrook, IL (US); Jessica Schapiro, Northbrook, IL (US); Marvin Lu, Northbrook, IL (US); Siddharth Daftary, Northbrook, IL (US); Michael Sharp, Northbrook, IL (US); Stephen Robert Newell, Northbrook, IL (US); William P. Burns, Northbrook, IL (US); Jhanani Dhakshnamoorthy, Northbrook, IL (US); Colin Hudson, Northbrook, IL (US)

(73) Assignees: Allstate Insurance Company, Northbrook, IL (US); InfoArmor, Inc., Scottsdale, AZ (US); Allstate Northern Ireland Limited, Belfast (GB)

( * ) Notice: Subject to any disclaimer, the term of this patent is extended or adjusted under 35 U.S.C. 154(b) by 647 days.

(21) Appl. No.: 17/479,889

(22) Filed: Sep. 20, 2021

(65) Prior Publication Data

US 2022/0004660 A1 Jan. 6, 2022

Related U.S. Application Data

(63) Continuation of application No. PCT/US2020/023840, filed on Mar. 20, 2020, which
(Continued)

(51) Int. Cl.
*G06F 21/62* (2013.01)
*G06Q 10/107* (2023.01)
(Continued)

(52) U.S. Cl.
CPC ....... *G06F 21/6245* (2013.01); *G06Q 10/107* (2013.01); *G06Q 50/265* (2013.01); *G06Q 40/03* (2023.01)

(58) Field of Classification Search
CPC ............. G06F 21/6245; G06Q 10/107; G06Q 50/265; G06Q 40/03
See application file for complete search history.

(56) References Cited

U.S. PATENT DOCUMENTS 6,249,807 B1 6/2001 Shaw et al.
6,321,267 B1 11/2001 Donaldson
(Continued)

FOREIGN PATENT DOCUMENTS

CN 105139182 A 12/2015

OTHER PUBLICATIONS

Spiceworks (How ro view a detail report of inactive users in office 365, by Darkxenorider of Jul. 29, 2013, relied upon comment dated Mar. 15, 2018, retrieved from https://community.spiceworks.com/topic/364025-how-to-view-a-detail-report-of-inactive-users-in-office-365 on Nov. 21, 2020). (Year 2018).
(Continued)

*Primary Examiner* — Vivek Srivastava
(74) *Attorney, Agent, or Firm* — Dinsmore & Shohl LLP

(57) ABSTRACT

Methods, computer-readable media, software, and apparatuses may assist a consumer in deleting personal information held by a data broker Entities holding the consumer's personal information may be discovered and automated actions for purging or deleting the consumer's personal information may be determined. The methods, computer-readable media, software, and apparatuses may assist the consumer in updating privacy settings associated with accounts at various entities.

12 Claims, 8 Drawing Sheets

Related U.S. Application Data is a continuation of application No. 16/823,864, filed on Mar. 19, 2020, now Pat. No. 11,232,229, which is a continuation-in-part of application No. 16/535,998, filed on Aug. 8, 2019, now Pat. No. 11,374,889, which is a continuation-in-part of application No. 16/359,489, filed on Mar. 20, 2019, now Pat. No. 11,196,693.

(51) Int. Cl.
*G06Q 50/26* (2012.01)
*G06Q 40/03* (2023.01)

(56) References Cited

U.S. PATENT DOCUMENTS

| | | | |
|---|---|---|---|
| 7,596,600 | B2 | 9/2009 | Quine et al. |
| 7,620,690 | B1 | 11/2009 | Castelli |
| 7,716,242 | B2 | 5/2010 | Pae et al. |
| 7,853,657 | B2 | 12/2010 | Martin |
| 7,996,530 | B1 | 8/2011 | Hogeboom et al. |
| 8,032,600 | B2 | 10/2011 | Paul |
| 8,255,468 | B2 | 8/2012 | Vitaldevara et al. |
| 8,560,619 | B1 | 10/2013 | Huston et al. |
| 8,726,349 | B2 | 5/2014 | Kavantzas et al. |
| 8,874,658 | B1 | 10/2014 | Khalsa et al. |
| 8,935,342 | B2 | 1/2015 | Patel |
| 8,949,462 | B1 | 2/2015 | Djabarov et al. |
| 9,536,108 | B2 | 1/2017 | Powell et al. |
| 10,354,750 | B2 | 7/2019 | Laborde |
| 2005/0188025 | A1 | 8/2005 | Landau et al. |
| 2006/0041505 | A1 | 2/2006 | Enyart |
| 2008/0115226 | A1 | 5/2008 | Welingkar et al. |
| 2009/0100099 | A1 | 4/2009 | Buckwalter |
| 2010/0106645 | A1 | 4/2010 | Peckover |
| 2010/0198927 | A1 | 8/2010 | Tonnison et al. |
| 2011/0161159 | A1 | 6/2011 | Tekiela et al. |
| 2012/0227097 | A1 | 9/2012 | Nakhjiri |
| 2013/0024520 | A1 | 1/2013 | Siminoff |
| 2013/0091042 | A1 | 4/2013 | Shah et al. |
| 2013/0238721 | A1 | 9/2013 | Patel |
| 2013/0275306 | A1 | 10/2013 | Ignatchenko et al. |
| 2014/0115067 | A1* | 4/2014 | Rosenwald .......... G06Q 10/107 |
| | | | 709/206 |
| 2014/0372196 | A1 | 12/2014 | Arthur |
| 2015/0081488 | A1 | 3/2015 | Turner et al. |
| 2015/0081825 | A1* | 3/2015 | Patel ....................... H04L 51/02 |
| | | | 709/206 |
| 2015/0161210 | A1 | 6/2015 | Cook et al. |
| 2015/0254783 | A1* | 9/2015 | Levin ................... G06Q 50/186 |
| | | | 705/30 |

| | | | |
|---|---|---|---|
| 2015/0294349 | A1 | 10/2015 | Capel et al. |
| 2015/0381533 | A1 | 12/2015 | Klemm et al. |
| 2016/0196451 | A1 | 7/2016 | Le Jouan |
| 2016/0364963 | A1 | 12/2016 | Matsuoka et al. |
| 2017/0070484 | A1 | 3/2017 | Kruse et al. |
| 2017/0180797 | A1 | 6/2017 | Splaine et al. |
| 2017/0193624 | A1 | 7/2017 | Tsai |
| 2017/0199920 | A1 | 7/2017 | Pearson et al. |
| 2017/0285896 | A1 | 10/2017 | Chandra et al. |
| 2017/0287035 | A1 | 10/2017 | Barday |
| 2017/0310821 | A1 | 10/2017 | Cook |
| 2017/0316225 | A1 | 11/2017 | Smith et al. |
| 2017/0323026 | A1 | 11/2017 | Le Bras et al. |
| 2017/0372301 | A1 | 12/2017 | Theurer et al. |
| 2018/0026996 | A1* | 1/2018 | Park ................... G06F 21/6245 |
| | | | 726/23 |
| 2018/0091521 | A1 | 3/2018 | Pachouri et al. |
| 2018/0314761 | A1 | 11/2018 | Lewin-Eytan et al. |
| 2018/0329940 | A1* | 11/2018 | Tiku ........................ G06F 9/546 |
| 2018/0341784 | A1* | 11/2018 | Barday ................. G06F 21/552 |
| 2019/0342336 | A1 | 11/2019 | Finkelstein et al. |
| 2021/0014218 | A1 | 1/2021 | Kurylko et al. |

OTHER PUBLICATIONS

Unsubscription: A Simple Way to Ease Overload in Email, https:/ldl.acm.org/citation.cfm?id=3159698 (2 pages) Aug. 29, 2018.

How to Unsubscribe from Mailing Lists and Junk Newsletters in Gmail, https://www.labnol.org/intemeUgmail-unsubscribe/28806/ (8 pages) Aug. 29, 2018.

3 Ways to Unsubscribe from Email Newsletters in Gmail, © 2007-2018 Uqnic Network Pte Ltd., https://www_maketecheasier.com/unsubscribe-email-newsletters-gmail/ (20 pages) Aug. 29, 2018.

Easy Ways to Unsubscribe Unwanted Emails, https://www.tutorialspoint.com/articles/easy-ways-to-unsubscribe-IJnwanted-emails-2, (6 pages), Aug. 29, 2018.

Unsubscriber The Easiest Way to Stop Unwanted Email, https://getunsubscriber.com (7 pages) Aug. 29, 2018.

3 Tools That Easily Unsubscribe You from Emails, https://www.pcworld.com/article/3181014/software/3-tools-for-easily-unsubscribing-to-emails.html (6 pages) Mar. 22, 2017.

3 Best Tools to Auto-Unsubscribe from Marketing Emails, https://www.guidingtech.com/27356/auto-unsubscribe-marketing-emails (6 pages) 2018 Guiding Media Pvt Ltd.

Gmail Offers to Automatically Unsubscribe You from Mailing Lists, https://lifehacker.com/5319723/gmail-offers-to-1:1utomatically-unsubscribe-you-from-mailing-lists (5 pages) Jul. 22, 2009.

How to Use IOS Mail's Auto Unsubscribe Fe ature, https://www.cultofmac.com/492680/how-to-use-ios-mail-auto-unsubscrive-feature/ (36 pages) Jul. 14, 2017.

Cisco Email Security—Graymail Management and Safe Unsubscribe, http://www.cisco.com/go/emailsecurity, (3 pages) 2018 Cisco.

\* cited by examiner

402 — Monitor at least one consumer email account

404 — Determine likelihood that email correspondence represents an account or subscription 406 — Generate list of accounts and subscriptions 408 — Determine an unsubscribe action for each account and subscription 410 — Generate revised list of accounts and subscriptions 502 — Monitor at least one consumer email account 504 — Determine likelihood that email correspondence represents an account or subscription 506 — Generate list of accounts and subscriptions 508 — Determine a deletion action for each account and subscription 510 — Generate revised list of accounts and subscriptions 702 — Determine data brokers storing consumer's personal information 704 — Output a listing of the data brokers 706 — Determine data removal actions 708 — Receive user input selecting one or more data brokers for data purge 710 — Communicate with selected data brokers to request data purge 712 — Receive response from data broker 714 — Output indication of the response

810

| | |
|---|---|
| Last Name: Doe | |
| First Name: John | |
| Date of Birth: January 1, 1990 | |
| Data Broker 1 | ☐ |
| Data Broker 2 | ☑ |
| Data Broker 3 | ☐ |
| Data Broker 4 | ☐ |
| | Submit |

UNSUBSCRIBE AND DELETE AUTOMATION

CROSS-REFERENCE TO RELATED APPLICATIONS

This application is a continuation of PCT/US2020/023840 filed Mar. 20, 2020, which is a continuation of U.S. patent application Ser. No. 16/823,864 filed on Mar. 19, 2020, which is a continuation-in-part of U.S. patent application Ser. No. 16/535,998 filed on Aug. 8, 2019, which is a continuation-in-part of U.S. application Ser. No. 16/359, 489, filed Mar. 20, 2019. The present application claims priority to and the benefit of the above identified applications, the disclosures of which are incorporated herein by reference in their entirety.

FIELD OF ART

Aspects of the disclosure generally relate to methods and computer systems, including one or more computers particularly configured and/or executing computer software. More specifically, aspects of this disclosure relate to methods and systems for unsubscribing and/or deleting a consumer from digital accounts or subscriptions, deleting personal information from a data broker, and/or updating privacy settings on digital accounts.

BACKGROUND

Protecting confidential information in today's online environment is difficult due to the increased connectivity and the increased number of consumer accounts accessible via web enabled computing devices. Consumers today have a large number of online subscriptions and accounts, and keeping track of all of them is difficult and time consuming. Many consumers have subscriptions and digital or web-based accounts that have been long forgotten, but those subscriptions and accounts may still be active, may contain personal information, and may be accessible online. It is important, from a digital safety perspective, that consumers be aware of all of their online accounts and be diligent in closing unused or no longer wanted subscriptions.

For each of these unused or unwanted accounts or subscriptions, a consumer may continue to receive unwanted emails and/or other communications. However, for consumers, unsubscribing and/or deleting unused or no longer needed accounts and subscriptions can be difficult.

Website owners provide privacy policies that may contain opt-out provisions that detail how to unsubscribe or delete an account, but finding such information is difficult and time consuming. Unsubscribing details may also be found in email list services or in marketing communications, but such unsubscribing details may be confusing and burdensome for consumers to implement. Therefore, there is a need for a simpler and more efficient approach to unsubscribing for consumers.

Furthermore, data brokers, such as credit reporting bureaus and people-search companies, may collect personal information about a consumer, even though the consumer may not have signed up for an account with the data broker. The consumer may not even be aware of these data brokers, and, since each data broker may have a different user interface, it may be difficult for the consumer to delete personal data held by these data brokers.

In addition, for those accounts that a consumer retains, a consumer may be able to modify privacy settings associated with their accounts, however, these privacy settings are often located deep inside a user interface hierarchy and each account may have a different user interface, making it challenging for the consumer to locate and modify these privacy settings.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for use by a consumer in order to discover and remove unwanted mailing list traffic and digital communication based relationships associated with a consumer's discovered accounts and subscriptions, to modify privacy settings associated with the accounts, and/or to purge personal information held by a data broker.

In an embodiment, for each identified account or subscription, an unsubscribe and deletion method may be determined and implemented for the consumer. Discovered accounts and subscriptions may be listed and displayed to the consumer along with recommendations and assistance for closing and purging any discovered unused or unwanted account or subscription, including any data associated with those accounts or subscriptions. In some aspects, the discovered accounts and subscriptions may be displayed with privacy setting options which, when selected, may cause updates to privacy settings of the associated accounts or subscriptions to be performed.

In some aspects, a listing of one or more data brokers may be displayed with user options for purging data held by the data brokers. Upon user selection, one or more data brokers may be contacted on behalf of the consumer and a request to delete personal information may be submitted.

In some aspects, the system may include at least one processor and a memory unit storing computer-executable instructions. The system may be configured to, in operation, determine the actual unsubscribe dialog or deletion criteria required for each requested action and execute the requested action using the appropriate method. The system may also be configured to, in operation, handle exceptions, report results, and transmit confirmations that the requests were successfully completed. The system may be configured to, in operation, create log records of the transactions.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 8 illustrates another exemplary user interface in accordance with one or more aspects described herein.

DETAILED DESCRIPTION

In accordance with various aspects of the disclosure, methods, computer-readable media, software, and apparatuses are disclosed for unsubscribing a consumer from some emails or other communications provided by vendors, institutions, or service providers having accounts or subscriptions related to the consumer. In addition, methods, computer-readable media, software, and apparatuses are disclosed for deleting and purging any discovered accounts or subscriptions of the consumer, along with deleting and purging any of the consumer's personal information associated with those accounts or subscriptions.

In accordance with various aspects of the disclosure, methods, computer-readable media, software, and apparatuses are disclosed for deleting and purging the consumer's personal information held by a data broker. Vendors, institutions, service providers, and data brokers may each be generally referred to herein as entities.

A vendor or service provider may maintain a privacy policy that describes how a consumer's personal data is collected and shared, whether a consumer can opt in/out of the collection of data, and/or whether a consumer can delete the collected personal data, for example. Personal data may include information such as the consumer's name, address, age, telephone number, email address, and products/services searched for, among others. The privacy policy opt-out instructions may also describe how a consumer can unsubscribe to the account or subscription. In accordance with various aspects of the disclosure, methods, computer-readable media, software, and apparatuses are disclosed for modifying privacy policy settings associated with accounts or subscriptions related to the consumer.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
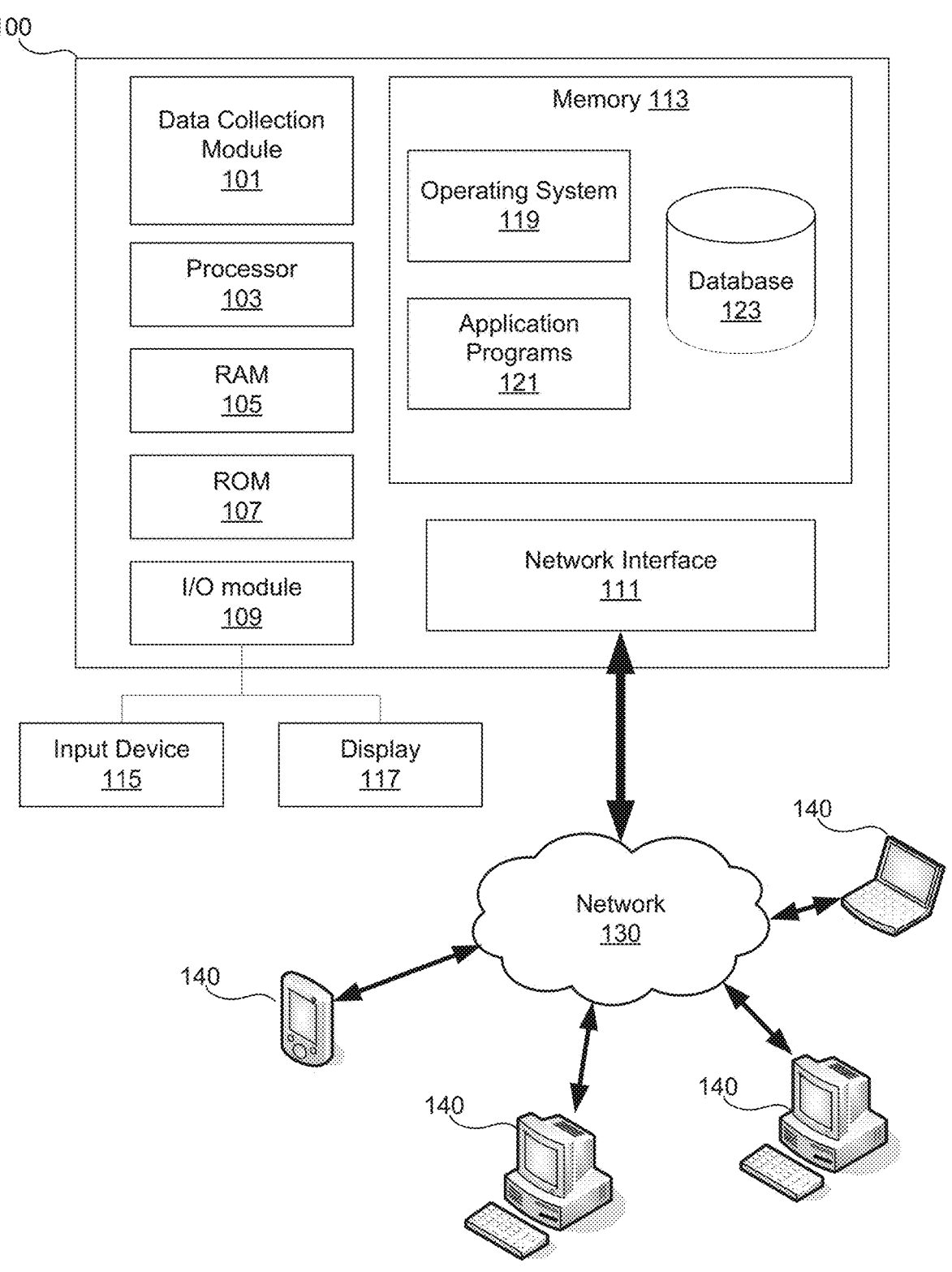
FIG. 1 illustrates an example cyber-privacy device that may be used in accordance with one or more aspects described herein.

In one or more arrangements, aspects of the present disclosure may be implemented with a computing device. FIG. 1 illustrates a block diagram of an example cyber-privacy device 100 that may be used in accordance with aspects described herein. The cyber-privacy device 100 may be a computing device, such as a personal computer (e.g., a desktop computer), server, laptop computer, notebook, tablet, smartphone, vehicles, home management devices, home security devices, smart appliances, etc. The cyber-privacy device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-privacy device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the cyber-privacy device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAJ\1105, ROM 107, and memory 113.

The I/O module 109 may be configured to be connected to an input device 115, such as a microphone, keypad, keyboard, touchscreen, and/or stylus through which a user of the cyber-privacy device 100 may provide input data. The I/O module 109 may also be configured to be connected to a display device 117, such as a monitor, television, touchscreen, etc., and may include a graphics card. The display device 117 and input device 115 are shown as separate elements from the cyber-privacy device 100; however, they may be within the same structure. On some cyber-privacy devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-privacy device 100 to perform various functions. For example, memory 113 may store software used by the cyber-privacy device 100, such as an operating system 119 and application programs 121, and may include an associated database 123.

The network interface 111 may allow the cyber-privacy device 100 to connect to and communicate with a network 130. The network 130 may be any type of network, including a local area network (LAN) and/or a wide area network (WAN), such as the Internet, a cellular network, or a satellite network. Through the network 130, the cyber-privacy device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-privacy device 100. In some embodiments, the cyber-privacy device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
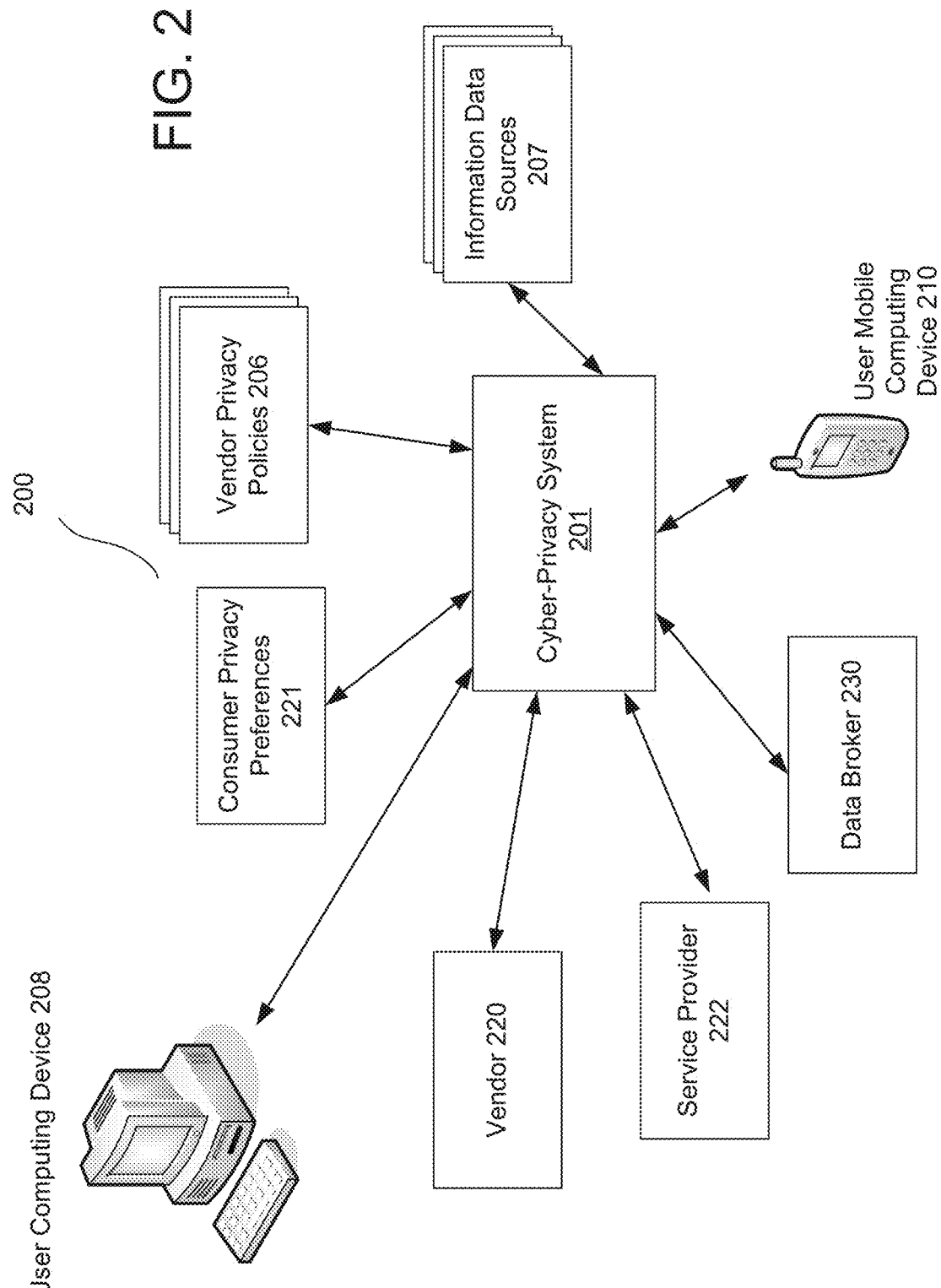
FIG. 2 shows a diagram illustrating the system architecture for a cyber-privacy system in accordance with one or more aspects described herein.

FIG. 2 shows a block diagram illustrating system architecture 200 for a cyber-privacy system 201. In some embodiments, the cyber-privacy system 201 may be implemented as part of a proxy server. In some other embodiments, the cyber-privacy system 201 may be implemented in a virtual private network (VPN) endpoint. In some embodiments, the cyber-privacy system 201 may be implemented as part of a cyber-privacy platform or as part of a digital safety framework. In some instances, the cyber-privacy system 201 may be a cyber-privacy device 100.

In an aspect of the disclosure, cyber-privacy system 201 may provide relationship discovery through analysis of a consumer's data. In an embodiment, cyber-privacy system 201 may determine and analyze relationship activity of a consumer using a variety of metrics (recency, frequency, interaction intensity) to offer suggestions as to which relationships are likely to be stale and which ones can be safely removed. In an embodiment, cyber-privacy system 201 may use deep scanning to analyze relationship history and frequency of messages received, opened, and/or sent. In an embodiment, cyber-privacy system 201 may determine that relationships where there has been no inbound (received) or outbound (sent) traffic for over twelve months (or other time periods which may be specified by the user, selected from a list of options or calculated using some relevant method, including but not limited to deterministic or probabilistic algorithms or machine learning models) may be classified as stale relationships. Cyber-privacy system 201 may recommend that these identified stale relationships be discarded.

In yet another embodiment, cyber-privacy system 201 may determine that relationships are stale if the current received email frequency is significantly less than the historic frequency. For example, when historic email frequency is monthly (or a more frequent interval) but recent frequency analysis shows no traffic for three months, cyber-privacy may recommend discarding the relationship. In an embodiment, cyber-privacy system 201 may have different defaults for different types of accounts and/or subscriptions and/or may allow consumers to use their own preferred values.

The cyber-privacy system 201 may collect information from, and transmit information to, a consumer through various different channels, such as via a user mobile computing device 210, or via a user computing device 208.

In some embodiments, the cyber-privacy system 201 may receive a request from a consumer for a product or service and may transmit the request to a vendor identified by the request. In other embodiments, cyber-privacy system 201 may receive a request from a consumer to unsubscribe or delete an existing account or subscription. For example, a consumer may still be receiving email communications from a service provider 222 based on a prior existing relationship with the service provider 222. The relationship may have ended, but the consumer may still be receiving information related to the relationship from the service provider 222. In such an instance, the consumer may want to unsubscribe to the email listing service of the service provider 222, as the communications are no longer relevant to the consumer.

In another example, a consumer may want to delete an unused account with a service provider 222 based on inactivity. In such an instance, the consumer may want to ensure that the unused account is properly closed, and the corresponding consumer data deleted, so that the associated account number or other information related to the account cannot be stolen and used by identity thieves.

In an aspect of the disclosure, cyber-privacy system 201 may, upon consumer activation, automatically unsubscribe the consumer from the email list services, subscriptions, and/or marketing communications of the service provider 222. In an embodiment, cyber-privacy system 201 may receive a consumer's request to unsubscribe and may determine the appropriate unsubscribe link or email address for the target relationship and automatically complete the unsubscribe process for the consumer.

In another example, vendor 220 may be sending emails or other correspondence to a consumer regarding a no longer utilized consumer subscription. The consumer may want to unsubscribe with vendor 220 to cancel any further correspondence from being delivered. In an embodiment, cyber-privacy system 201 may, after receiving a request from a consumer to unsubscribe from vendor 220's correspondence, parse discovered electronic correspondence from vendor 220 to determine or detect an unsubscribe link or an unsubscribe email address. In an aspect of the disclosure, cyber-privacy system 201 may determine the unsubscribe method being used for the target relationship and automatically complete the unsubscribe process for the consumer. In an embodiment, the detection of an unsubscribe link or an unsubscribe email address in an electronic correspondence may provide a strong indication that the electronic correspondence is not a personal correspondence.

In another aspect of the disclosure, cyber-privacy system 201 may, upon consumer activation, automatically begin an account purge process so that a consumer may delete their personal information obtained by third parties. Such third parties may be using or selling the received consumer data, without the consumer's knowledge or consent.

In an aspect of the disclosure, cyber-privacy system 201 may, upon consumer activation, automatically begin a purge process so that a consumer may delete personal information obtained by a data broker 230. In some embodiments, cyber-privacy system 201 may be pre-configured with names or other identifiers of data brokers 230, and with corresponding procedures for deleting consumer data from the data brokers 230. For example, for each data broker 230, an email address or one or more URLs (for example, a sequence of URLs) may be preconfigured to enable the cyber-privacy system 201 to automate the purge process. The cyber-privacy system 201 may present a listing of the data brokers 230 for selection by a consumer and may automatically perform associated procedures or steps to delete the consumer's personal information from selected data brokers 230. In various embodiments, the procedures may include sending an email to a data broker 230 to request that data be purged, or may include sending one or more HTTP messages to a website of a data broker 230. For example, cyber-privacy system 201 may send multiple HTTP messages to a website of a data broker 230 to effectively simulate a consumer interacting with the website, clicking through various options/selections/pages on the website, in order to purge the consumer's personal information.

In some embodiments, the cyber-privacy system 201 may query one or more of the pre-configured data brokers 230, in order to determine whether a data broker currently stores any personal information related to the consumer. For example, the cyber-privacy system 201 may send a message via email or HTPP identifying the consumer, and may receive a message from the data broker to confirm that the consumer is known to the data broker and that the consumer's personal information is stored by the data broker. In these embodiments, the cyber-privacy system 201 may present data brokers storing the consumer's personal information in the listing discussed above, while not presenting the data brokers that do not currently store the consumer's personal information.

Cyber-privacy system 201 may retrieve information from a plurality of information data sources 207 in order to determine the digital presence of a consumer. A data retrieval engine may be configured to monitor (e.g., continuously monitor) each of the information data sources 207 and report data of interest from any one of these data sources to the cyber-privacy system 201. For example, the data retrieval engine may interface with one or more digital accounts (banking accounts, social media accounts, digital storefronts, etc.) or data brokers to determine if accounts are created, active, and/or in use, or to determine whether the consumer's personal information is being stored.

In some additional embodiments, cyber-privacy system 201 may generate a listing for the consumer of discovered online accounts associated with the consumer. The accounts may be categorized into various groups such as financial accounts and subscriptions associated with the consumer. The categorized listings may assist a consumer in keeping track of their numerous online accounts, all of which may contain various forms of confidential information. In an embodiment, the account listing may be filtered in numerous ways to provide insights. For instance, the listing of accounts may be filtered to show ail accounts that store/show the consumer's location or share the consumer's financial information.

In an embodiment, cyber-privacy system 201 may monitor a consumer's email accounts to determine a listing of the consumer's accounts with companies or institutions. Similarly, a consumer's email accounts may also be monitored to determine a number of online subscriptions associated with the consumer.

In an embodiment, cyber-privacy system 201 may generate separate lists for a consumer listing all of the consumer's discovered accounts and all of the consumer's online subscriptions. The generated lists may be used to assist the consumer in closing unused or unwanted accounts, in order to reduce the risk of confidential information being obtained and prevent unauthorized use of accounts a consumer may have long forgotten about. In another embodiment, cyber-privacy system 201 may, upon discovery of consumer's accounts, allow the consumer to globally change information such as a consumer address or phone number across all of the discovered accounts simultaneously. The aggregation and consolidation mechanism of the present disclosure may allow a consumer to update and manage numerous accounts efficiently.

In an embodiment, consumer privacy preferences 221 may represent the privacy preferences of a consumer. In some embodiments, the cyber-privacy system 201 may provide a user interface via which a consumer may configure the consumer privacy preferences 221, for example by using user computing device 208 or user mobile computing device 210. In some embodiments, the consumer privacy preferences 221 may be associated with the computing device sending a request for a product or service, for example, user computing device 208. In some embodiments, the consumer privacy preferences 221 may have been previously stored by the cyber-privacy system 201, for example, in a local database. In other embodiments, consumer privacy preferences 221 may be received by cyber-privacy system 201 as part of the request sent by the consumer. In still other embodiments, cyber-privacy system 201 may retrieve the consumer privacy preferences 221 from a computing device via a network, for example, after receiving the request from the consumer In some embodiments, the cyber-privacy system 201 may be configured with artificial-intelligence capabilities to understand a consumer's preferences, based n a consumer's usage over time. In an embodiment, consumer privacy preferences 221 may include a consumer's preferences for handling unsubscribing and/or deletion of discovered unused or unwanted accounts and subscriptions. For instance, consumer privacy preferences 221 may include consumer-set preferences for handling unsubscribing and/or deletion automation of discovered accounts and subscriptions.

In some embodiments, consumer privacy preferences 221 may include a consumer's preferences for the handling of their personal information by service provider 222 or vendor 220. In various embodiments, the consumer privacy preferences 221 may be a single set of preferences to be applied to all service providers 222 and vendors 220, or may include different preferences for particular service providers 222 or vendors 220.

In an embodiment, vendor privacy policies 206 may include privacy policies of one or more vendors or service providers. Vendor privacy policies 206 may include a privacy policy associated with the vendor's website for various accounts and subscriptions. For example, the privacy policy associated with the vendor 220 may have been previously stored by the cyber-privacy system 201, for example, in a local database. In some other embodiments, the privacy policy associated with the vendor 220 may be retrieved from the vendor's website, or from another location, for example, after receiving the request from the consumer. In various embodiments, the cyber-privacy system 201 may process or translate one or more vendor privacy policies into an internal format.

In some embodiments, the consumer privacy preferences 221 may include information related to one or more privacy categories. The vendor privacy policies 206 may be compared to the consumer privacy preferences 204 by comparing information in each of the privacy categories. In some embodiments, the privacy categories may include categories generally related to data collection, data usage, data sharing, and data management. As an example, the consumer privacy preferences 221 may indicate that the consumer does not want collected personal data to be shared by the vendor 220. In another example, the consumer privacy preferences 221 may indicate that the consumer wants to be able to delete collected personal data stored by the vendor 220. In still another example, the consumer privacy preferences 221 may indicate that the consumer wants to be able to opt in, or opt out of, having their personal data collected by the vendor

220. The vendor privacy policy 206 may include information indicating the vendor's policy related to one or more of these privacy categories.

In some embodiments, the cyber-privacy system 201 may store a consumer profile for one or more consumers that includes the consumers' privacy preferences 221. In these embodiments, the cyber-privacy system 201 may keep an account for each consumer and may identify the consumer when the consumer logs n or submits other identifying information. In other embodiments, the consumer privacy preferences may be received by the cyber-privacy system 201 when a consumer sends a request for a product or service.

A consumer may have an account with a service provider 222, such as a social networking web site, for example. The service provider 222 may provide a means, such via a web interface, for the consumer to adjust the privacy settings associated with the consumer's account. For example, the privacy settings may control who can see a consumer's photos, location history, contact information, identification, and/or messages stored by the service provider 222. In addition, the privacy settings may control how the consumer's personal information is used, racked, retained, or shared by the service provider 222.

In some embodiments, the cyber-privacy system 201 may automate the update of a consumer's account privacy settings with one or more vendors 220 or service providers 222. For example, in some embodiments, the cyber-privacy system 201, responsive to an input from the consumer, may update privacy preferences by communicating with a service provider 222 or vendor 220, via email, to provide a data sharing agreement on behalf of the consumer. The data sharing agreement may include information about the consumer's privacy preferences, such as one or more requests related to data privacy. For example, the data sharing agreement may indicate a request or requirement for certain restrictions on sharing, by service provider 222 or vendor 220, of the consumer's personal information. In some embodiments, the data sharing agreement may convey the requirement or request by specifying a particular level of data sharing.

For example, the levels of data sharing may include a first level, in which the consumer is willing to let the service provider 222 or vendor 220 broadly share and/or sell the consumer's personal information. The first level may correspond to the default privacy practices of a service provider, as indicated in its privacy policy. The levels of data sharing may include a second level, more restrictive than the first level, in which the consumer is willing to let the service provider 222 or vendor 220 share and/or sell the consumer's personal information, as long as it is in an anonymized form. The levels of data sharing may include a third level, more restrictive than the second level, in which the consumer is willing to let the service provider 222 or vendor 220 use the consumer's personal information only to provide a product or service to the consumer For example, at the third level, the consumer's personal information may not be shared with affiliates or third parties, and may not be used for analytics, marketing, and/or modeling, nor sold or used in an anonymized form. The levels of data sharing may include a fourth level, more restrictive than the third level, in which the consumer is not willing to let the service provider 222 or vendor 220 collect or use the consumer's personal information outside of the immediate transaction, and no cookies may be embedded in the consumer's device. In other words, at the fourth level, the consumer is requiring a guest relationship with the service provider 222 or vendor 220. In various embodiments, the data sharing agreement may include additional levels, or fewer levels, according to aspects described herein. As those skilled in the art would understand, the above-described privacy practices corresponding to each level are illustrative of what each level may represent, and each level may correspond to different/other privacy practices in various embodiments. In general, the levels may represent a privacy spectrum from open (i.e., consumer is comfortable with the service provider capturing data and using that data in a variety of ways) to closed (i.e., no collection of data, sharing, or selling of data is permitted). Each level may represent privacy-related actions that the company 1 s or is not allowed to take (e.g., buying, selling, or sharing personal information; contacting the user; tracking the user, etc.). In some embodiments, the data sharing agreement may be based on the consumer privacy preferences 221 discussed above.

After sending the data sharing agreement, the cyber-privacy system 201 may receive a response from the service provider 222 or the vendor 220 indicating success or failure in conforming to the consumer's data sharing agreement. In some embodiments, the response may be in the form of an email message which may indicate the status or outcome of the request. Upon receipt of the response, the cyber-privacy system 201 may provide a notification to the consumer, such as an indication in a user interface, providing the status or outcome of the request.

In some embodiments, rather than emailing the data sharing agreement, the cyber-privacy system 201 may update a consumer's account privacy settings directly with the service provider 222 or vendor 220. For example, the cyber-privacy system 201 may communicate with the service provider 222 or vendor 220 via public facing application programming interfaces provided by the service provider 222 or vendor 220. In some embodiments, the cyber-privacy system 201 may make an update via an HTTP interface with the service provider 222 or vendor 220 website. In some embodiments, the cyber-privacy system 201 may be pre-configured with one or more URLs of a service provider 222 or vendor 220, and the cyber-privacy system 201 may submit HTTP messages to the one or more URLs, thereby automatically navigating, or "clicking through", the vendor 220 or service provider 222 user interface and updating the consumer's account privacy settings. For example, a vendor website may include multiple web pages via which portions of the privacy settings may be updated, and the cyber-privacy system 201 may send HTTP messages to multiple URLs in order to accomplish the update. In some embodiments the vendor website may require an ordered sequence of interactions, in which case the cyber-privacy system 201 may send HTTP messages to the URLs in an ordered sequence to accomplish the update. In some embodiments, the cyber-privacy system 201 may update a consumer's account privacy settings in accordance with the consumer privacy preferences 221 discussed above. In another aspect of the disclosure, cyber-privacy system 201, after initiating the privacy update, may request that the consumer enter some particular consumer data or other data required by the privacy update process. For example, the vendor website may return a message with a security question or with a CAPTCHA. In such an instance, cyber-privacy system 201 may provide a user interface screen for the consumer to enter any such required information.

When updating the consumer's privacy preferences via email using the data sharing agreement or via HTTP messaging, the cyber-privacy system 201 may provide the service provider 222 or vendor 220 with consumer identifying information, such as a username and password, email address, first name, last name, and/or birthdate, in order to authorize the update in the consumer's privacy settings or to identity the consumer's account to the service provider 222 or vendor 220.

In some embodiments, the cyber-privacy system 201 may output, for display to a consumer, a listing of all the discovered accounts or subscriptions. The listing may include the age of the account or subscription and the last time the account or subscription was utilized.

In some embodiments, the cyber-privacy system 201 may track a consumer's online communications with various websites over time, for example, in order to gather a consumer's digital footprint. In some embodiments, the cyber-privacy system 201 may perform an analysis on the gathered digital footprint to assess alignment between the associated vendor privacy practices and a consumer's privacy preferences. In some embodiments, the analysis may be triggered based on a change in a consumer's privacy preferences 221. In other embodiments, the analysis may be triggered by a request, from a consumer, to do so. In some other embodiments, the analysis may be triggered based on an elapsed time since a previous analysis was performed. In some other embodiments, the analysis may be triggered by a change in one or more vendor privacy practices.

In an aspect of the disclosure, cyber-privacy system 201 may discover and maintain a link to an unsubscribe relationship page for each discovered account or subscription. In an embodiment, cyber-privacy system 201 may determine an unsubscribe link and unsubscribe relationship page during an initial account scan and relationship determination process. In some embodiments, the unsubscribe link may be unique to each consumer, and in these embodiments, the cyber-privacy system 201 may associate the unsubscribe link with the consumer's profile. In another embodiment, an unsubscribe link and unsubscribe relationship page may be determined during analysis of a webpage's privacy statement or analysis of an email list services website. In some embodiments, cyber-privacy system 201 may determine an email address for unsubscribing by analyzing an email header. For example, an email header of a marketing communications email may include an email address for unsubscribing from future marketing emails.

In an embodiment, a uniform resource locator (URL) for each unsubscribe link and the determined unsubscribe method associated with each account and subscription may be stored by cyber-privacy system 201. In the event that no method for unsubscribing can be determined, cyber-privacy system 201 may compare each account or subscription to similar accounts or subscriptions to determine an unsubscribe method. In an embodiment, if an unsubscribe process cannot be determined, cyber-privacy system 201 may list the unsubscribe method as "manual" or "blocked."

In an aspect of the disclosure, cyber-privacy system 201 may provide a method by which a consumer can request an unsubscribe action for at least one relationship. In an embodiment, cyber-privacy system 201 may confirm each unsubscribe request. The request may be initiated by a consumer through a user interface screen generated by cyber-privacy system 201 and displayed on user computing device 208. In another embodiment, a consumer may initiate an unsubscribe request from the generated account and/or subscription listing displayed to the consumer by cyber-privacy system 201.

In an embodiment, cyber-privacy system 201 may retrieve the actual unsubscribe dialog required for each requested action from storage and execute the appropriate action to unsubscribe. Cyber-privacy system 201 may provide an indication to the consumer that the unsubscribe action was successfully completed. If an exception occurs, cyber-privacy system 201 may handle the exception and notify the consumer. For example, cyber-privacy system 201 may determine that the method to unsubscribe to an account has been changed or updated by the account provider.

In an embodiment, cyber-privacy system 201 may determine the new updated process for the account and automatically unsubscribe the consumer using the new or updated process. In another embodiment, cyber-privacy system 201 may make numerous attempts to unsubscribe a consumer from an account over a predetermined time period, should the account's website be temporarily unavailable.

If cyber-privacy system is unsuccessful in unsubscribing, a communication or indication may be supplied to alert the consumer. In an embodiment, where an automatic unsubscribe action cannot be completed, the consumer may receive information from cyber-privacy system 201 on how to manually unsubscribe to the account or subscription. In an embodiment, cyber-privacy system 201 may generate a log to track unsubscribe outcomes.

In an aspect of the disclosure, cyber-privacy system 201 may scan emails for unsubscribe indicators in any consumer received communication. For instance, the word "unsubscribe" may be found upon parsing of the communication. In some communications, the word "unsubscribe" may be found in the header or footer block of the communication. For example, many emails have the unsubscribe language located in the footer block. In an embodiment, the unsubscribe language may include an embedded link to an unsubscribe dialog page.

In an embodiment, cyber-privacy system 201 may parse an email communication to determine a link to an unsubscribe page for an account or subscription. In an embodiment, if the link includes a parameter string, the parameter string may be analyzed to determine what values are to be passed in order to unsubscribe.

In an aspect of the disclosure, cyber-privacy system 201 may determine the information needed to unsubscribe. In an embodiment, a consumer's email address or other identifying information may be needed to unsubscribe from an account or subscription. For example, cyber-privacy system 201 may need to transmit a consumer's email address to an unsubscribe page. The transmission and receipt of the consumer's email address may act as a control parameter triggering the unsubscribe action. In an embodiment, the unsubscribe page may refresh and provide a completion message. The completion or confirmation message may be displayed. Cyber-privacy system 201 may store the completion or confirmation message and provide the consumer with an indication that the unsubscribe action has been successful.

In another embodiment, cyber-privacy system 201, after transmitting the consumer's email address and/or other identifying information, may confirm that the consumer wishes to initiate the unsubscribe action. In such an instance, cyber-privacy system 201 may transmit a confirmation to unsubscribe from the account or subscription. If needed, cyber-privacy system 201 may store any changes.

In another aspect of the disclosure, cyber-privacy system 201, after initiating the unsubscribe process, may request that the consumer enter some particular consumer data required by the account or subscription. In such an instance, cyber-privacy system 201 may provide a user interface screen for the consumer to enter any such required information.

In yet another aspect of the disclosure, cyber-privacy system 201 may have to deselect different email content types in order to unsubscribe. In an embodiment, cyber-privacy system 201 may select an "unsubscribe from all" option to successfully unsubscribe to all email communications for a particular account or subscription.

In an aspect of the disclosure, cyber-privacy system 201 may parse the content of an email communication for key words such as "Cancel" or "Remove" or "Delete". In an embodiment, it may be necessary to explicitly save changes to trigger an unsubscribe request or account deletion request. In another embodiment, a confirmation of the request may be required. A successful result page may be displayed upon completion of the unsubscribe action or deletion action. In some embodiments, deselecting all individual options may trigger the "unselect all" choice.

In another aspect of the disclosure, cyber-privacy system 201 may uncheck each of the communication type options because no "unsubscribe all" selection feature exists. In this scenario, cyber-privacy system 201 may save all of the changes and confirm the unsubscribe request. In yet another embodiment, cyber-privacy system 201 may have to select additional pages in order to reach the deselect list.

Cyber-privacy system 201 may include a reason for unsubscribing, if required by the unsubscribe process. The reason may be selected from a drop-down list or entered as free text. In some cases, the reason request may be embedded within the unsubscribe process, but may be optional.

In an aspect of the disclosure, cyber-privacy system 201 may discover and maintain a link to a delete relationship page for each discovered account or subscription. In an embodiment, cyber-privacy system 201 may determine an account deletion process for each discovered account. In an embodiment, cyber-privacy system 201 may store and retrieve the deletion process required for each discovered account from storage and execute the appropriate deletion process upon consumer activation. In some embodiments, cyber-privacy system 201 may request input of consumer credentials, in order to use those credentials in completing the deletion process. In an embodiment, cyber-privacy system 201 may confirm each account delete request. The request may be initiated by a consumer through user interface screen generated by cyber-privacy system 201 and displayed on user computing device 208 or user mobile computing device 210. In another embodiment, a consumer may initiate an account deletion request from the generated account and/or subscription listing displayed to the consumer by cyber-privacy system 201. Cyber-privacy system 201 may provide an indication to the consumer that the account deletion process was successfully completed. If an exception occurs, cyber-privacy system 201 may handle the exception and notify the consumer.

In another embodiment, cyber-privacy system 201 may make numerous attempts to delete a consumer account over a predetermined time period, should the account's website be temporarily unavailable. If cyber-privacy system 201 is unsuccessful in deleting an account, a communication or indication may be supplied to alert the consumer. In an embodiment where an automatic deletion action cannot be completed, the consumer may receive information from cyber-privacy system 201 on how to manually delete the account or subscription. In an embodiment, cyber-privacy system 201 may generate a log to track deletion outcomes.

In an embodiment, cyber-privacy system 201 may allow a consumer to add an account to the listing of the consumer's accounts, in addition to the discovered accounts that may be listed. For example, the cyber-privacy system 201 may provide one or more user entry fields by which a consumer may enter information to manually add an account. The information may include credentials for authenticating the consumer when logging into the account, a URL for unsubscribing, and a selection of a delete method. In some embodiments, the cyber-privacy system 201, upon detecting that a consumer has navigated to a web page of an account that is not currently in the listing of the consumer's accounts, may provide a user interface prompt, for example via a plug-in, offering to add the account to the listing. After the consumer has added an account to the listing, the cyber-privacy system 201 may enable the consumer to unsubscribe from email communications associated with the account, or delete the account at the associated vendor 220 or service provider 222.

Figure 3:
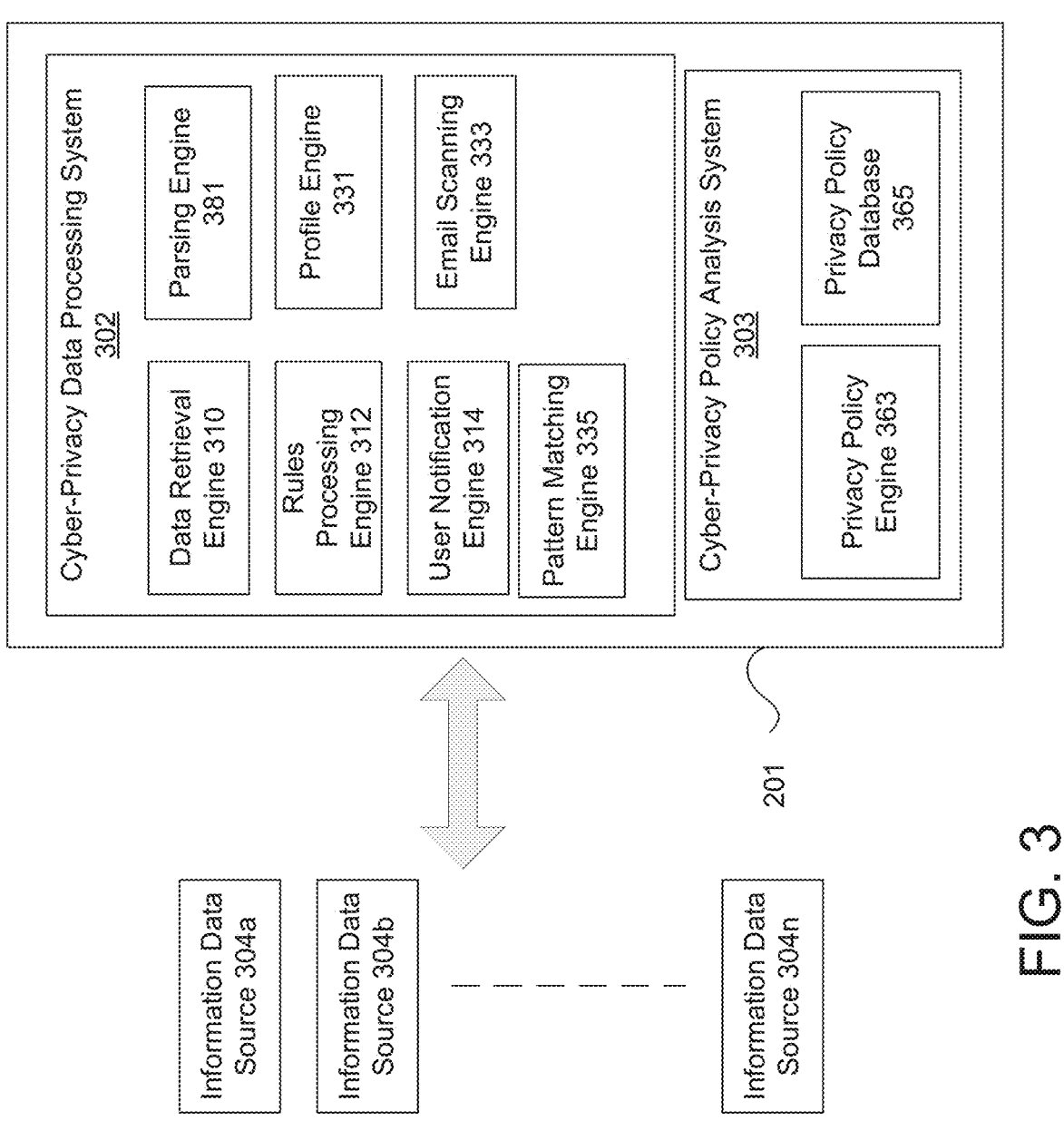
FIG. 3 illustrates a block diagram of a cyber-privacy system in accordance with one or more aspects described herein.

FIG. 3 illustrates a block diagram of particular portions of a cyber-privacy system 201. As shown in FIG. 3, the cyber-privacy system 201 may communicate with a plurality of information data sources 304a, 304b 304n, to scan the email correspondences of a consumer to discover accounts and subscriptions of the consumer and to collect information related to the privacy policies of the various discovered accounts and subscriptions. In some embodiments, the information data sources 304a, 304b 304n may include the web sites of vendor 220 and/or service provider 222, illustrated in FIG. 2.

In some embodiments, the cyber-privacy system 201 may comprise a cyber-privacy data processing system 302 and a cyber-privacy privacy policy analysis system 303. In accordance with an aspect of the disclosure, cyber-privacy data processing system 302 may include an email scanning engine 333 and a pattern matching engine 335. In an embodiment, email scanning engine 333 may monitor at least one email account of the consumer. A consumer's email password and access information may have been provided by the consumer during an account setup process. The cyber-privacy system's parsing engine 381 may parse the metadata found in each email header to determine source information and/or unsubscribe information for each email correspondence in the consumer's email account. The parsed metadata may include a domain name identifying the source of the email correspondence and/or may include an email address for unsubscribing from future emails from the source. In an embodiment, monitoring of the consumer's email account may be limited to a consumer's inbox or specified folders containing email correspondence. In an embodiment, based on the determined source information for each email correspondence, cyber-privacy system 201 may generate a list of entities associated with a consumer. The list of entities may be verified with the consumer profile or other gathered information regarding the consumer. The list of entities may be displayed to the consumer.

In an embodiment, cyber-privacy system 201 may determine for each email correspondence a likelihood that each email correspondence represents a subscription of the consumer. Cyber-privacy system 201 may, in at least one embodiment, determine that an email contains references to an existing subscription based on results from a pattern recognition algorithm. The pattern recognition algorithm may search for various words, phrases, or other identifiable criteria. For instance, the pattern recognition algorithm may search for the word unsubscribe in an email correspondence indicating that the email correspondence is associated with an existing consumer subscription.

In another embodiment, based on the determined likelihood that each email correspondence represents a subscription of the consumer, cyber-privacy system 201 may generate a list of subscriptions associated with the consumer. The generated list of subscriptions may be displayed to the consumer and stored in the consumer profile record.

In an embodiment, cyber-privacy system 201 may automatically initiate closing of select accounts listed in one of the generated lists based on predetermined criteria. In some embodiments, the automatic closing of select accounts listed in one of the generated lists may be based on criteria chosen by the consumer. For instance, cyber-privacy system 201 may close accounts that have not been accessed for a predetermined period of time such as greater than one year. In another embodiment, cyber-privacy system 201 may generate recommendations based on the identification of the sources of the subscriptions. In another embodiment, the consumer may determine that various accounts should be closed based on a review of the listings. In this case, a consumer may indicate via a user interface that various accounts should be closed and cyber-privacy system 201 may begin an account closing process for the consumer.

In an embodiment, cyber-privacy data processing system 302 may generate a consumer profile at profile engine 331. The consumer profile may be generated using at least in part data received and/or collected from information data sources 304-304*n*. The consumer profile may include details of the consumer, including but not limited to a consumer's name, age, address, driver's license number, credit card, or bank information, insurance policies, networked devices associated with the consumer, and privacy preferences, etc. In an embodiment, the consumer may enter additional information or confirm information found in their consumer profile through a mobile application or computing device interface. Additional information that may be entered by the consumer includes account details and or verification of online accounts used by a consumer.

Privacy policies from numerous vendors may be fed into privacy policy engine 363 to determine information such as 1) what information is being collected from a consumer, 2) what the information of the consumer will be used for, and 3) whether the vendor will make the information available to third parties. Additional information that may be determined from the analyzed privacy policy may include, but is not limited to, consumer's rights and choices to access the data and make correction or deletion, rights or choices regarding data collection, how cookies are used, an organization's contact information, and the effective date of the policy.

In some embodiments, a machine-learning algorithm may be trained based on a number of human-classified privacy policies. For example, in an embodiment, privacy policy engine 363 may include a conical data model and a supervised machine learning model for analyzing privacy policies. For instance, exemplary privacy policies may be tagged and used to build a classifier for analyzing subsequent privacy policies as typical privacy policies include sections of information discussing the various types of information being collated from a consumer, how such information may be used, and whether third parties will have access to the collected information. The added metadata to the exemplary privacy policies may be used by privacy policy engine 363 to identify information of interest in additional scanned privacy policies. In an embodiment, the output of privacy policy engine 363 may be stored in privacy policy database 365.

In an embodiment, privacy policy engine 363 may adjust the tagging scheme based on the accuracy of the results and the variability of the terminology used in different privacy policies. In another embodiment, privacy policy engine 63 may be used with different languages other than English.

In an embodiment, cyber-privacy privacy policy engine 363 may compare privacy policies of similar classifications of vendors (for example, vendors selling shoes, or vendors selling clothing, or vendors selling groceries). Such analysis may result in faster processing times of additional privacy policies, and may flag new additional provisions to be tagged. In an embodiment, additional information that privacy policy engine 363 may determine include data security information, compliance information, data retention information, and user control information.

In another embodiment, if privacy policy engine 363 does not find any data of interest in a privacy policy, a flag may be set for further review of the privacy policy. The flag may be stored in privacy policy database 365.

In an aspect of the disclosure, the cyber-privacy system 201 may be configured to, in operation, analyze the privacy policy for each institution, business, vendor, and/or service provider associated with a consumer determined from an email scan, browser history, and/or browser cache search. The cyber-privacy system may also analyze the on-line privacy policies of each institution, business, vendor, and/or service provider for which the consumer has an account, based on information provided by an analysis of the consumer's profile. The determined information may be displayed to the consumer along with recommendations regarding personal data safety.

In an embodiment, a consumer device, such as user computing device 208, may include an application or a browser plugin, for example, that communicates with cyber-privacy system 201 to evaluate the privacy policy of a vendor before sending a request directly to the vendor web site.

Figure 4:
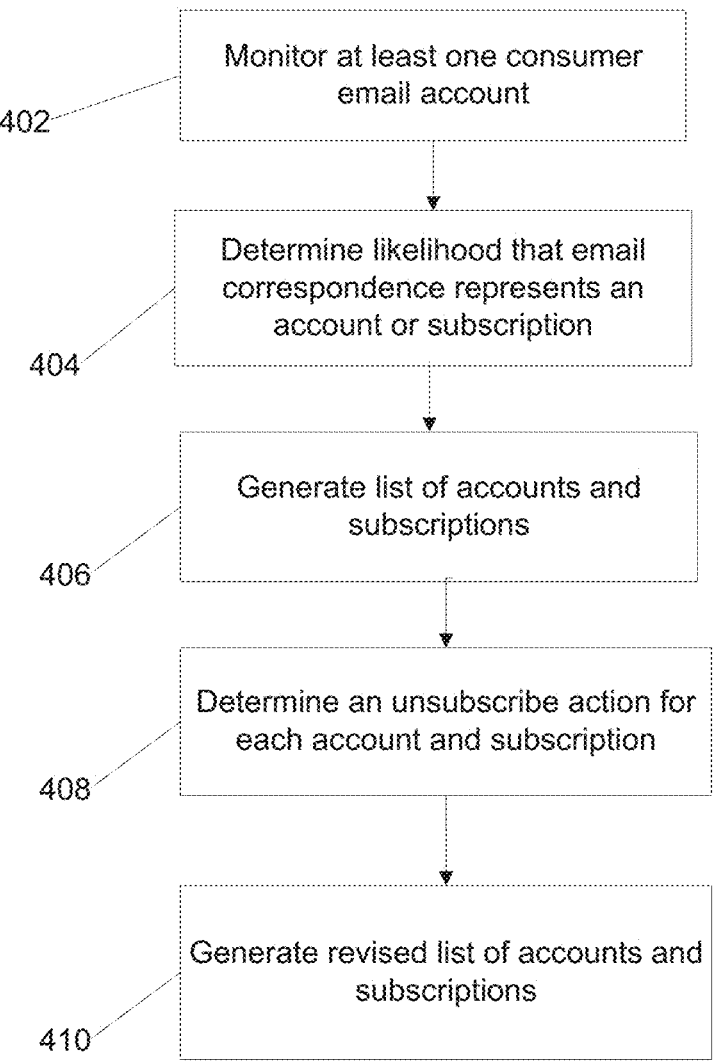
FIG. 4 illustrates an exemplary method m accordance with one or more aspects described herein.

FIG. 4 illustrates an exemplary method m accordance with one or more aspects described herein. In FIG. 4 at step 402, at least one email account of a consumer may be monitored. Cyber-privacy system 201 may, in step 404, determine the likelihood that each email correspondence represents an account or a subscription of the consumer. Cyber-privacy system 201 may in at least one embodiment, determine that an email contains references to an existing subscription based on results from a pattern recognition algorithm. The pattern recognition algorithm may search for various words, phrases, or other identifiable criteria.

In step 406, cyber-privacy system 201 may, based on the determined likelihood that each email correspondence represents an account or subscription of the consumer, generate a list of accounts and subscriptions associated with the consumer. The generated list of accounts and subscriptions may be displayed to the consumer and stored in the consumer profile record.

In step 408, cyber-privacy system 201 may determine, for each account and subscription, an unsubscribe action. The unsubscribe action may comprise a Uniform Resource Locator (URL) and at least one unsubscribe dialog parameter. In step 410, cyber-privacy system 201 may generate a revised list of accounts and subscriptions including the determined unsubscribe action for each account and subscription.

Figure 5:
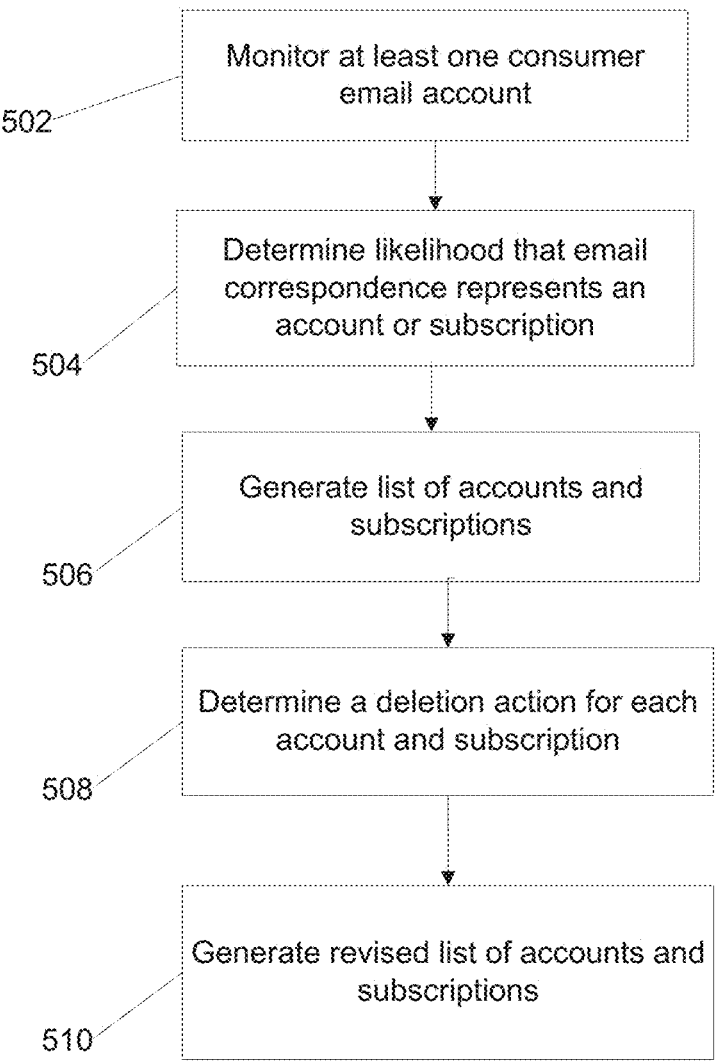
FIG. 5 illustrates another exemplary method in accordance with one or more aspects described herein.

FIG. 5 illustrates an exemplary method in accordance with one or more aspects described herein. In FIG. 5 at step 502, at least one email account of a consumer may be monitored. Cyber-privacy system 201 may, in step 504, determine the likelihood that each email correspondence represents an account or a subscription of the consumer. Cyber-privacy system 201 may in at least one embodiment, determine that an email contains references to an existing subscription, based on results from a pattern recognition algorithm. The pattern recognition algorithm may search for various words, phrases, or other identifiable criteria.

Figure 6:
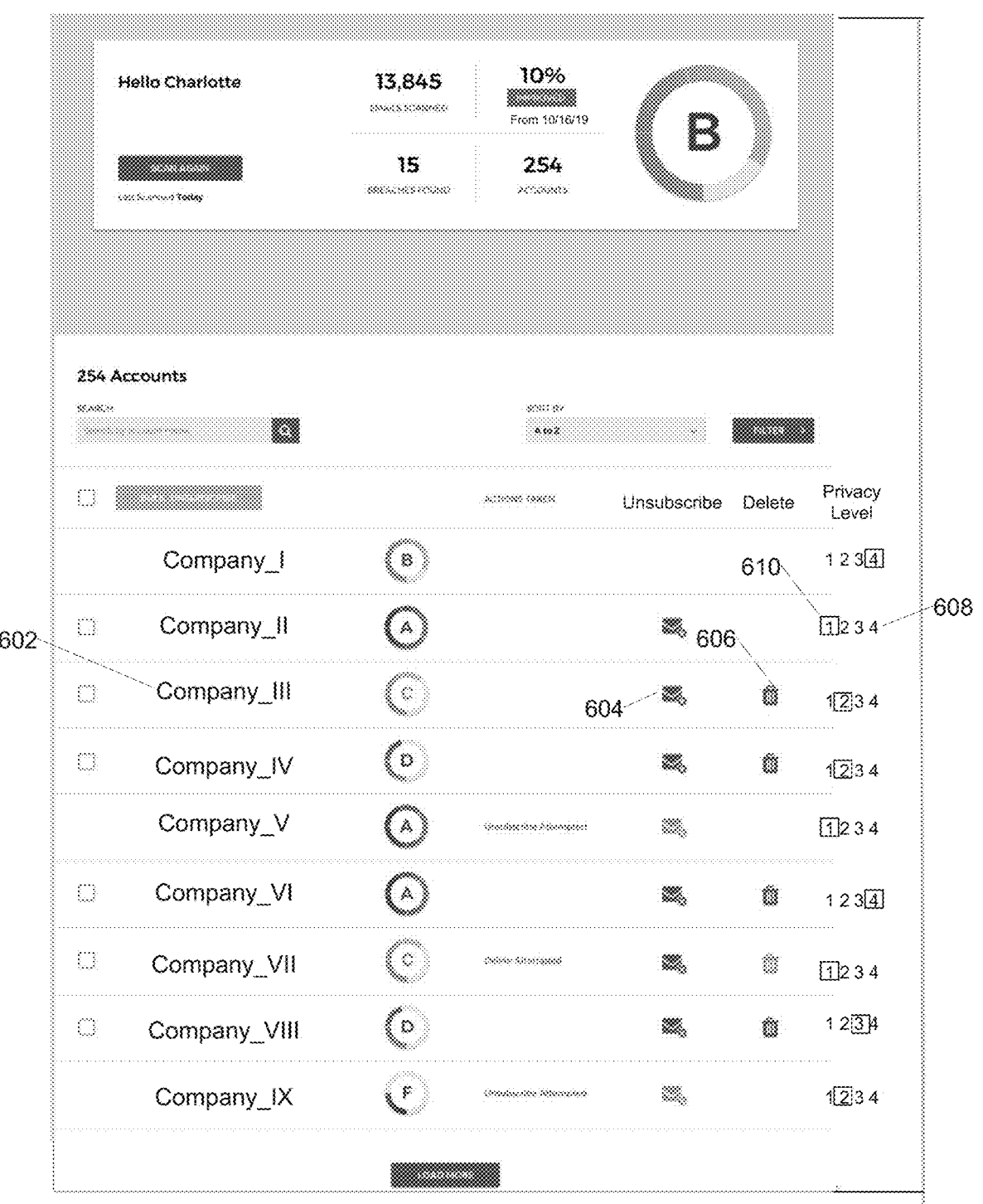
FIG. 6 illustrates an exemplary user interface in accordance with one or more aspects described herein.

In step 506, cyber-privacy system 201 may, based on the determined likelihood that each email correspondence represents an account or subscription of the consumer, generate a list of accounts, subscriptions, and/or entities associated with the consumer. The generated list of accounts and subscriptions may be displayed to the consumer and stored in the consumer profile record. As noted above, manually added accounts may be displayed in the listing, in addition to discovered accounts. In an embodiment, FIG. 6 illustrates the generated listing of accounts and subscriptions. For instance, FIG. 6 illustrates a consumer account with "Company_III" (602), along with associated icons to initiate unsubscribe (604) and account deletion (606) actions. In some embodiments, various privacy level options 608 may be displayed and associated with a consumer account. These privacy level options 608 may be selected individually, so that the consumer may indicate the required or preferred privacy level for each account. For example, a privacy level of "1" has been selected, as indicated by the label 610, for the account associated with Company_II. In an embodiment, the privacy level options 608 correspond to the levels of data sharing discussed above. The selection of one of the privacy level options 608 may cause the cyber-privacy system 201 to send a data sharing agreement to, or otherwise communicate with, a service provider 222 or vendor 220 as discussed above.

In step 508, cyber-privacy system 201 may determine for each account and subscription an account deletion action. The account deletion action may initiate an account deletion process. In an embodiment, the account deletion process may include automatically generating and transmitting an email requesting that the account be deleted by the account provider and that all corresponding data be removed. In another embodiment, the account deletion process may interact with the account website for deleting the consumer's account. In an embodiment, cyber-privacy system 201 may transmit multiple responses if the account deletion requires verification or further account closing information. In some embodiments, the cyber-privacy system 201 may monitor a consumer's email inbox for responses to deletion requests and may notify the consumer of these responses, for example, to inform the consumer when the request has been completed. In step 510, cyber-privacy system 201 may generate a revised list of accounts and subscriptions including the determined deletion action for each account and subscription.

Figure 7:
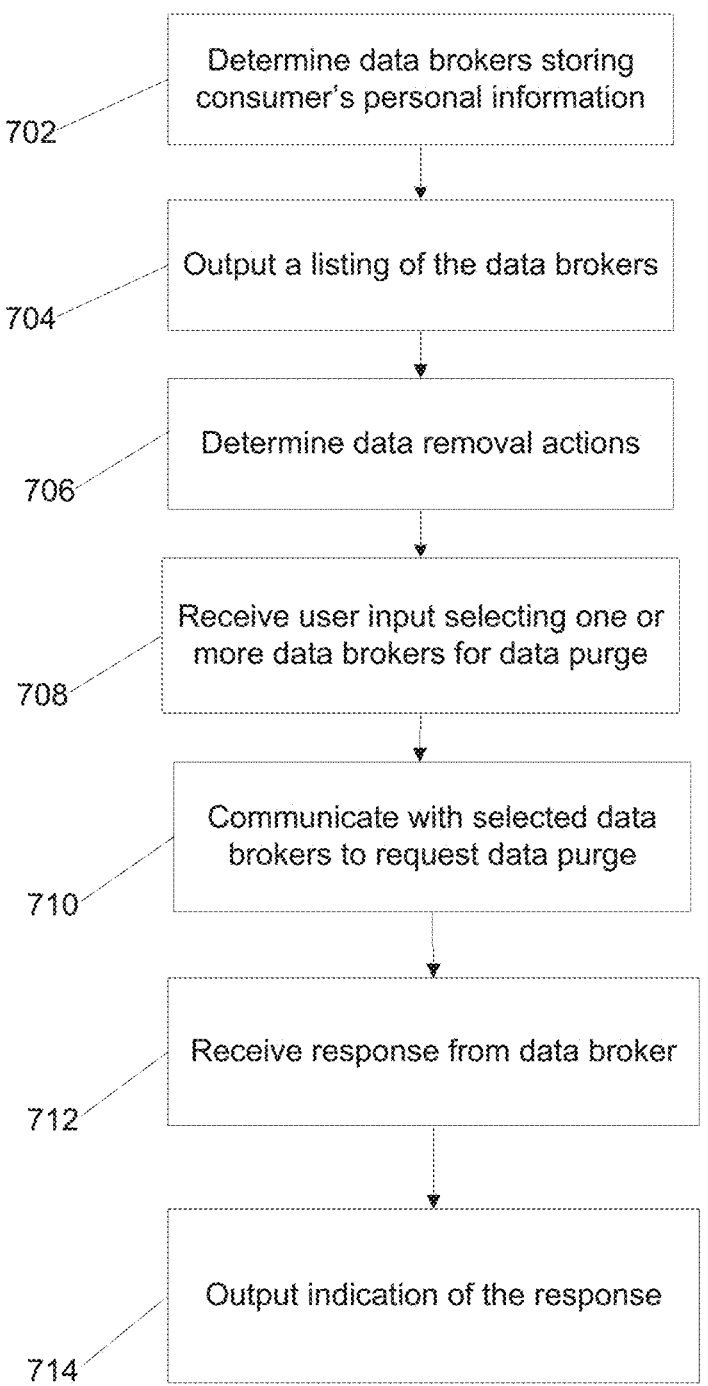
FIG. 7 illustrates another exemplary method in accordance with one or more aspects described herein.

FIG. 7 illustrates an exemplary method m accordance with one or more aspects described herein. In FIG. 7 at step 702, the cyber-privacy system 201 may determine data brokers 230 storing a consumer's personal information. As discussed above, the data brokers may be determined based on a pre-configuration, or may be determined via discovery, such as via a query message sent to various known data brokers. At step 704, the cyber-privacy system 201 may output a list of data brokers 230 for display.

At step 706, the cyber-privacy system 201 may determine data removal actions applicable to one or more data brokers 230. For example, these actions may include the communications needed to interact with a data broker website to cause the purge of a consumer's personal information. At step 708, the cyber-privacy system 201 may receive input indicating the selection of one or more data brokers 230 as a request from a consumer to purge the consumer's personal information from the selected data brokers 230.

In step 710, the cyber-privacy system 201 may communicate with each of the selected data brokers to request that the data brokers 230 purge or delete the consumer's personal information. As discussed above, in various embodiments, the procedures may include sending an email to a data broker 230 to request that the consumer's personal information be purged, or may include sending one or more HTTP messages to a website of a data broker 230. For example, cyber-privacy system 201 may send multiple HTTP messages to a website of a data broker 230 to effectively simulate a consumer interacting with the web site, clicking through various options/selections/pages on the website in order to purge the consumer's personal information. In another embodiment, the cyber-privacy system 201 may cause the printing and mailing of a paper form to one or more of the selected data brokers 230 to request that the consumer's personal information be purged or deleted. In various embodiments, cyber-privacy system 201 may store consumer identifying information, or other information, in order to autocomplete forms or otherwise provide information to a data broker as may be needed for completing the purge or delete process.

In step 712, cyber-privacy system 201 may receive a response from one or more of the data brokers 230. For example, the cyber-privacy system 201 may receive an HTTP message to indicate a status of the request. The status may indicate that the consumer's personal information has been deleted, or that the request has been received and will be processed, or that the request has been denied or that it has failed. In some embodiments, the cyber-privacy system 201 may receive an email message indicating the status of the request. In these embodiments, the cyber-privacy system 201 may parse the email message to locate status information. At step 714, the status or result of request may be output for display to the consumer.

FIG. 8 illustrates an exemplary user interface in accordance with one or more aspects described herein. The cyber-privacy system 201 may provide the user interface of FIG. 8 to enable a consumer to purge or delete their data from one or more data brokers 230. Consumer identifying information 810, such as a first name, last name, and/or birthdate, may be input so that the cyber-privacy system 201 may identify the consumer to the data broker 230. Various other consumer identifying information may be required in order to identify the consumer to some data brokers. The consumer identifying information 810 may be input by the consumer or generated by the cyber-privacy system 201. As shown in FIG. 8, the consumer identifying information 810 may be used for interacting with one or more data brokers 230.

The cyber-privacy system 201 may provide a listing 820 of data brokers for selection by a consumer. As discussed above, the data brokers 230 may be pre-configured in the cyber-privacy system 201. For instance, the cyber-privacy system 201 may be configured with the name and contact information corresponding to one or more known data brokers 230. The cyber-privacy system 201 may also be pre-configured to interface with the data brokers 230, as discussed above. The consumer may select one or more of the data brokers, for example, by selecting one or more checkboxes 830, from which they wish to delete their personal information. For example, the consumer may select a checkbox associated with a data broker 230 in order to indicate the intention to delete data at the associated data broker. Next, the consumer may select the "submit" button 840 to request the cyber-privacy system 201 to purge or delete the personal information held by that data broker 230.

In some embodiments, the cyber-privacy system 201 may communicate with a selected data broker in order to cause the data broker to delete or purge the consumer's personal information. Based on the example information presented in the user interface of FIG. 8, the cyber-privacy system 201 may communicate with "Data Broker 2" to request that data broker to delete any personal information associated with John Doe, who was born on Jan. 1, 1990, being held by the data broker.

In some embodiments, the communication with the data broker 230 may include HTTP messages. For example, a data broker may provide a web interface via which a consumer may interact with the data broker by use of a web browser. For example, a consumer may navigate through various links and hierarchy provided at the data broker's website in order to reach a web page where they can enter their personally identifying information and submit a request to delete their personal information. According to aspects disclosed herein, the cyber-privacy system 201 may be pre-configured to perform this HTTP messaging and website navigation, on behalf of the consumer, and may provide the personally identifying information and submit the request to delete the personal information on behalf of the consumer. In some embodiments, the cyber-privacy system 201 may submit the personally identifying information and the request directly to a URL of the data broker 230, without need to navigate a hierarchy. For example, the cyber-privacy system 201 may be pre-configured with a URL of the data broker 230 for deleting personal information.

In some embodiments, the consumer's personally identifying information 810 may be pre-populated automatically by a browser plugin when the consumer interacts with the cyber-privacy system 201 at the user interface shown in FIG. 8.

In some embodiments, the cyber-privacy system 201 may communicate with the data broker, to request that the data broker delete the consumer's personal information, using one or more email messages.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system, comprising:

one or more processors configured to:

determine, for a plurality of items of email correspondence, a plurality of user accounts indicated by information included in the email correspondence, wherein the user accounts are associated with a particular user;

determine a plurality of different personal information elements associated with the particular user that correspond to one or more personal information categories of information, and that are stored within one or more systems associated with at least two different accounts of the plurality of user accounts;

analyze one or more privacy policies associated with the plurality of user accounts to determine whether the particular user is allowed to modify the different personal information elements;

present an option for selecting one or more of the personal information categories as a filter for account display; and responsive to selection of one or more personal information categories, display all accounts, from the plurality of user accounts, that store personal information elements that correspond to a selected one or more personal information categories, and for each account, a respective indication of whether the particular user is allowed to modify personal information associated with the selected one or more personal information categories.

2. The system of claim 1, wherein the plurality of different personal information elements includes one or more of a particular location, a particular address, a particular phone number, or a particular credit card number associated with the particular user.

3. The system of claim 1, wherein the one or more personal information categories includes one or more of: a location category, an address category, a phone number category, a credit card number category, or a financial category.

4. The system of claim 1, wherein the one or more processors are further configured to:

receive input indicating at least one personal information category;

determine one or more accounts that store personal information elements corresponding to the received at least one personal information category;

receive a new personal information element; and after determining that respective privacy policies of the one or more accounts allow modification of the different personal information elements, automatically replace respective personal information elements stored in the determined one or more accounts with the new personal information element.

5. A method comprising:

determining, for a plurality of items of email correspondence, a plurality of user accounts indicated by information included in the email correspondence, wherein the user accounts are associated with a particular user;

determining a plurality of different personal information elements associated with the particular user that correspond to one or more personal information categories of information, and that are stored within one or more systems associated with at least two different accounts of the plurality of user accounts;

analyzing one or more privacy policies associated with the plurality of user accounts to determine whether the particular user is allowed to modify the different personal information elements;

presenting an option for selecting one or more of the personal information categories as a filter for account display; and responsive to selection of one or more of the personal information categories, displaying all accounts, from the plurality of user accounts, that store personal information elements that correspond to a selected one or more personal information categories, and for each account, a respective indication of whether the particular user is allowed to modify personal information associated with the selected one or more personal information categories.

6. The method of claim 5, wherein the plurality of different personal information elements includes one or more of a particular location, a particular address, a particular phone number, or a particular credit card number associated with the particular user.

7. The method of claim 5, wherein the one or more personal information categories includes one or more of: a location category, an address category, a phone number category, a credit card number category, or a financial category.

8. The method of claim 5, further comprising:

receiving input indicating at least one personal information category;

determining one or more accounts that store personal information elements corresponding to the received at least one personal information category;

receiving a new personal information element; and after determining that respective privacy policies of the one or more accounts allow modification of the different personal information elements, automatically replacing respective personal information elements stored in the determined one or more accounts with the new personal information element.

9. A non-transitory computer-readable storage medium storing instructions that, when executed by one or more processors, cause the one or more processors to perform operations comprising:

determining, for a plurality of items of email correspondence, a plurality of user accounts indicated by information included in the email correspondence, wherein the user accounts are associated with a particular user;

determining a plurality of different personal information elements associated with the particular user that correspond to one or more personal information categories of information, and that are stored within one or more systems associated with at least two different accounts of the plurality of user accounts;

analyzing one or more privacy policies associated with the plurality of user accounts to determine whether the particular user is allowed to modify the different personal information elements;

presenting an option for selecting one or more of the personal information categories as a filter for account display; and responsive to selection of one or more of the personal information categories, displaying all accounts, from the plurality of user accounts, that store personal information elements that correspond to a selected one or more personal information categories, and for each account, a respective indication of whether the particular user is allowed to modify personal information associated with the selected one or more personal information categories.

10. The non-transitory computer-readable storage medium of claim 9, wherein the plurality of different personal information elements includes one or more of a particular location, a particular address, a particular phone number, or a particular credit card number associated with the particular user.

11. The non-transitory computer-readable storage medium of claim 9, wherein the one or more personal information categories includes one or more of: a location category, an address category, a phone number category, a credit card number category, or a financial category.

12. The non-transitory computer-readable storage medium of claim 9, wherein the instructions cause the one or more processors to perform further operations comprising:

receiving input indicating at least one personal information category;

determining one or more accounts that store personal information elements corresponding to the received at least one personal information category;

receiving a new personal information element; and after determining that respective privacy policies of the one or more accounts allow modification of the different personal information elements, automatically replacing respective personal information elements stored in the determined one or more accounts with the new personal information element.

\* \* \* \* \*